United States Patent Office 2,918,449
Patented Dec. 22, 1959

2,918,449

COPOLYMERS OF DIALKENYL MONOCHLOROMETHANEPHOSPHONATE

Arthur Dock Fon Toy, Park Forest, and Kenneth H. Rattenbury, South Chicago Heights, Ill., assignors to Victor Chemical Works, a corporation of Illinois No Drawing. Application January 27, 1955
Serial No. 484,584

17 Claims. (Cl. 260—45.4)

This invention relates to copolymers of dialkenyl monochloromethanephosphonates and materials copolymerizable therewith. More specifically, this invention relates to flame-resistant copolymers of diallyl and dimethallyl monochloromethanephosphonates and materials copolymerizable therewith.

This application is a continuation-in-part of copending application Serial No. 302,835, Patent 2,714,100, filed August 5, 1952.

It has been found that many commonly used flammable, polymerizable monomers, when copolymerized with a dialkenyl monochloromethanephosphonate are improved in physical quality and at the same time rendered flame-resistant. This unexpected flame-resistance is achieved by mixing as little as ten percent of the phosphonate monomer with the flammable monomer followed by heating in the presence of a small quantity of a catalyst (i.e., organic peroxide). The various proportions of reactants and catalyst and the conditions of time and temperature suitable for producing the copolymers of this invention may be varied over a considerable range as will be shown in the following examples.

The dialkenyl monochloromethanephosphonates may be prepared by reacting an alkenyl alcohol with methanephosphorus oxydichloride in the presence of tertiary amines such as pyridine and triethylamine with or without an inert solvent such as benzene, hexane, etc.

The copolymerizable materials that may be copolymerized with the dialkenyl monochloromethanephosphonates are numerous and include vinyl acetate, methyl methacrylate, and various diallyl esters of phthalic acid and saturated aliphatic dicarboxylic acids such as oxalic, succinic, sebacic, adipic and the like.

In addition to the above-described copolymerizable materials containing ethylenic unsaturation that may be polymerized with the dialkenyl monochloromethanephosphonate, polymerizable polyesters may be employed that are characterized by unsaturated carbon-to-carbon bonds and hence are capable of undergoing polymerization during curing without the liberation of water. Three groups of compounds which may be used in the preparation of these unsaturated polyesters are as follows: (1) acids such as maleic, fumaric, itaconic, phthalic and the like; (2) alcohols or glycols such as allyl alcohol, ethylene glycol and diethylene glycol; (3) unsaturated hydrocarbons such as styrene, cyclopentadiene and the like. For example, the polyesters disclosed in United States Patent No. 2,255,313 are illustrative of these unsaturated polyesters. Certain commercial polyesters such as the "Laminacs" sold by American Cyanamid Company also form satisfactory copolymers. The specific Laminacs hereinafter referred to are maleic anhydride-ethylene glycol type polyesters containing styrene. For example Laminac No. 4201 (partially polymerized unsaturated polyester such as generally described in U.S. Pat. No. 2,443,736, containing an alkenyl aryl cross-linking agent, such as diallyl phthalate, and the reaction product of an alpha, beta ethylenically unsaturated polycarboxylic acid, such as maleic or fumaric acid, a saturated polycarboxylic acid free of non-benzoid unsaturation, such as phthalic acid, and at least one glycol, such as ethylene glycol and/or diethylene glycol), produced by American Cyanamid Company, may be used.

The following examples illustrate some of the copolymers of the invention. In all cases, unless otherwise stated, the designated amounts of the chloromethanephosphonate and selected monomer were placed in a small bottle and the requisite amount of catalyst added. The bottle was then flushed with nitrogen, stoppered tightly, and placed in an oil bath for 16 hours at 85° C. Proportions are parts by weight in all cases.

TABLE I

Copolymers of diallyl chloromethanephosphonate with diallyl phthalate (DAP)

| Percent DCMP | Percent DAP | Percent $B_{z2}O_2$[1] | Physical Appearance | Flammability,[2] sec. |
|---|---|---|---|---|
| 0 | 100 | 2.5 | Light yellow, tough solid | >15 |
| 10 | 90 | 2.5 | ----do---- | 1 |
| 20 | 80 | 2.5 | ----do---- | 1 |
| 30 | 70 | 2.5 | ----do---- | 1 |
| 50 | 50 | 2.0 | ----do---- | 1 |
| 70 | 30 | 1.5 | ----do---- | 1 |
| 90 | 10 | 1.3 | ----do---- | 1 |

[1] See footnote 1, Table II.
[2] See footnote 2, Table II.

TABLE II

Copolymers of diallyl chloromethanephosphonate (DCMP) with methyl methacrylate (MM)

| Percent DCMP | Percent MM | Percent $B_{z2}O_2$[1] | Physical Appearance | Flammability,[2] sec. |
|---|---|---|---|---|
| 0 | 100 | 0.08 | Clear, colorless, bubbly solid | >15 |
| 10 | 90 | 0.12 | ----do---- | >15 |
| 20 | 80 | 0.14 | ----do---- | >15 |
| 30 | 70 | 0.2 | Fractured, colorless solid | 1 |
| 50 | 50 | 0.4 | Light yellow, tough solid | 1 |
| 70 | 30 | 0.6 | ----do---- | 1 |
| 90 | 10 | 0.9 | ----do---- | 1 |

[1] Benzoyl peroxide catalyst, based on total weight.
[2] Flammability in all cases was measured by heating a piece of the product (3/16" to 1/8" in diameter) for 15 seconds in the tip of a 1" to 1½" blue flame, and then removing the flame and determining how long the piece continued to burn. The recorded time in each case is the longest of three tests. Flame resistance is deemed satisfactory if the burning time is less than 15 seconds.

TABLE III

Copolymers of diallyl chloromethanephosphonate with diallyl succinate (DAS)

| Percent DCMP | Percent DAS | Percent $B_{z2}O_2$ | Physical Appearance | Flammability, sec. |
|---|---|---|---|---|
| 0 | 100 | 2.5 | Clear, light yellow, tough artgum | >15 |
| 10 | 90 | 2.5 | Clear, light yellow, tough solid | >15 |
| 20 | 80 | 2.5 | ----do---- | 2 |
| 30 | 70 | 2.5 | ----do---- | 1 |
| 50 | 50 | 2.0 | ----do---- | 1 |
| 70 | 30 | 1.5 | ----do---- | 1 |
| 90 | 10 | 1.3 | ----do---- | 1 |

TABLE IV

Copolymers of diallyl chloromethanephosphonate with vinyl acetate (VA) [1]

| Percent DCMP | Percent VA | Percent $B_2O_2$ | Physical Appearance | Flammability |
|---|---|---|---|---|
| 0 | 100 | 0.2 | Bubbly artgum | >15 sec. |
| 10 | 90 | 0.2 | Cloudy, tough solid | 2 sec. |
| 20 | 80 | 0.4 | do | 1 sec. |
| 30 | 70 | 0.5 | do | 1 sec. |
| 50 | 50 | 0.6 | Fractured artgum | |
| 70 | 30 | 0.7 | do | (Artgums not tested.) |
| 90 | 10 | 0.9 | Artgum | |

[1] Polymerization at 55-70° C. for 20 hours.

TABLE V

Copolymers of diallyl chloromethanephosphonate and Laminac 4201

| Percent DCMP | Percent Laminac | Percent $B_2O_2$ | Physical Appearance | Flammability, sec. |
|---|---|---|---|---|
| 0 | 100 | 1.0 | Clear, light yellow, tough solid | >15 |
| 10 | 90 | 0.5 | do | 2 |
| 20 | 80 | 0.5 | Clear, light yellow, fractured solid | 1 |
| 30 | 70 | 0.6 | do | 4 |
| 50 | 50 | 0.7 | do | 2 |
| 70 | 30 | 0.8 | Clear, light yellow, hard artgum | 2 |
| 90 | 10 | 0.9 | Clear, light yellow, tough solid | 1 |

TABLE VI

Copolymers of diallyl chloromethanephosphonate with Laminac 4150

| Percent DCMP | Percent Laminac | Percent $B_2O_2$ | Physical Appearance | Flammability |
|---|---|---|---|---|
| 0 | 100 | 0.5 | Clear, yellow, tough solid | >15 sec. |
| 10 | 90 | 0.5 | do | >15 sec. |
| 20 | 80 | 0.6 | do | 2 sec. |
| 30 | 70 | 0.9 | do | 4 sec. |
| 50 | 50 | 1.1 | Clear, yellow, rubbery solid | not tested. |
| 70 | 30 | 1.3 | do | Do. |
| 90 | 10 | 1.5 | Clear, yellow, tough solid | 1 sec. |

Similar samples of Laminac 4116 and a mixture of Laminac 4116 (75%) and Laminac 4734 (25%) were polymerized with diallyl chloromethanephosphonate and were found to produce satisfactory flame-resistant solids in all compositions containing at least 20% of the phosphonate monomer.

It can be seen from the above examples that for the diallyl chloromethanephosphonate the degree of flame resistance of its copolymers generally increases as the percentage of phosphonate increases. As little as ten percent gives satisfactory resistance in some cases. The level at which the copolymer becomes self-extinguishing varies somewhat with the different nonphosphonate monomers but is generally in the range of 10–30%.

This is in sharp contrast to the behavior of the dimethallyl chloromethanephosphonate. This compound when polymerized individually burns readily. Even when copolymerized with 50% of the diallyl ester the copolymer burns readily. However, when the flammable dimethallyl ester is copolymerized with other flammable monomers, as shown in the following examples, a flameproof resin is produced in many instances.

TABLE VII

Copolymers of dimethallyl chloromethanephosphonate with diallyl phthalate

| Percent DCMP | Percent DAP | Percent $B_2O_2$ | Physical Appearance | Flammability, sec. |
|---|---|---|---|---|
| 10 | 90 | 3.0 | Light yellow, fractured solid | 1 |
| 20 | 80 | 3.0 | Light yellow, tough solid | 1 |
| 30 | 70 | 2.5 | do | 1 |
| 90 | 10 | 1.8 | do | >15 |

TABLE VIII

Copolymers of dimethallyl chloromethanephosphonate with Laminac 4201

| Percent DCMP | Percent Laminac | Percent $B_2O_2$ | Physical Appearance | Flammability, sec. |
|---|---|---|---|---|
| 10 | 90 | 0.5 | Light yellow, tough solid | >15 |
| 20 | 80 | 0.6 | Light yellow, fractured solid | 2 |
| 30 | 70 | 0.8 | do | 2 |
| 90 | 10 | 1.8 | Light yellow, tough solid | >15 |

TABLE IX

Copolymers of dimethallyl chloromethanephosphonate with methyl methacrylate

| Percent DCMP | Percent MM | Percent $B_2O_2$ | Physical Appearance | Flammability, sec. |
|---|---|---|---|---|
| 10 | 90 | 0.12 | Colorless, bubbly tough solid | >15 |
| 20 | 80 | 0.14 | do | >15 |
| 30 | 70 | 0.22 | do | 7 |
| 90 | 10 | 1.3 | Light yellow, tough solid | >15 |

TABLE X

Copolymers of dimethallyl chloromethanephosphonate with vinyl acetate [1]

| Percent DCMP | Percent VA | Percent $B_2O_2$ | Physical Appearance | Flammability |
|---|---|---|---|---|
| 10 | 90 | 0.2 | Cloudy, tough solid | 3 sec. |
| 20 | 80 | 0.4 | Fractured, tough solid | 2 sec. |
| 30 | 70 | 0.5 | Cloudy, tough solid | 1 sec. |
| 90 | 10 | 1.3 | Colorless artgum | Not tested. |

[1] Polymerization at 55-70° for 20 hours.

The conditions of time and temperature at which polymerization takes place may be varied over quite a wide range and still produce satisfactory flame-resistant products. Thus, in the following examples the monomer mixture was heated at 70-85° C. until the copolymer gelled after which the temperature was raised to complete the polymerization in a short time.

EXAMPLE I

Ten parts of diallyl chloromethanephosphonate and 90 parts of diallyl phthalate were mixed with 2.5% benzoyl peroxide in a glass bottle which was then flushed with nitrogen and sealed. The bottle was put in an oil bath at 85° C. and held there for 2 hours and 45 minutes (one hour past the gelation stage). It was then held at 110° C. for 2 hours, which completed the polymerization, to give a light yellow, tough solid which was self-extinguishing.

EXAMPLE II

The procedure of Example I was repeated using 10 parts diallyl chloromethanephosphonate, 90 parts Laminac 4201, and 0.5% catalyst. After heating at 70° C. for 2 hours and 15 minutes, and 110° C. for 1 hour, a light yellow, tough, self-extinguishing solid resulted.

EXAMPLE III

Using a similar procedure, 30 parts of diallyl chloromethanephosphonate, 70 parts methacrylate and 0.2% catalyst were heated at 70° C. for 2 hours and 55 minutes, 85° C. for 1 hour and 110° C. for 1 hour. A bubbly, hard, tough, colorless, self-extinguishing solid resulted.

EXAMPLE IV

The dimethallyl chloromethanephosphonate ester was used to repeat Examples I–III except that a 20/80 ratio was used with Laminac 4201 and the amounts of catalyst were varied slightly. Tough self-extinguishing solids were produced in each case.

The above tables and examples show only copolymers in which at least ten percent of the phosphonate monomer is included. Copolymers containing as little as one percent of the phosphonate may be similarly made to produce hard, clear products. The advantages to be obtained from the phosphonate, however, will be less at these lower levels.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description and all changes which come within the meaning and language of equivalency of the claims are therefore intended to be embraced therein.

We claim:

1. A flame-resistant copolymer of lower dialkenyl monochloromethanephosphonate and materials containing ethylenic unsaturation copolymerizable therewith.
2. A copolymer of diallyl monochloromethanephosphonate and materials containing ethylenic unsaturation copolymerizable therewith.
3. A copolymer of dimethallyl monochloromethanephosphonate and materials containing ethylenic unsaturation copolymerizable therewith.
4. A copolymer of 1–90% of a phosphate compound from the class consisting of diallyl monochloromethanephosphonate and dimethallyl monochloromethanephosphonate and 99–10% of copolymerizable material containing ethylenic unsaturation.
5. A copolymer of 1–90% of a lower dialkenyl monochloromethanephosphonate and 99–10% of polymerizable material containing ethylenic unsaturation from the group consisting of methyl methacrylate, vinyl acetate, maleic anhydride-ethylene glycol condensation product containing styrene, and diallyl esters of a member of the class consisting of saturated aliphatic dicarboxylic acids and phthalic acid.
6. The copolymer of claim 5 wherein the lower dialkenyl monochloromethanephosphonate is diallyl monochloromethanephosphonate.
7. The copolymer of claim 5 wherein the lower dialkenyl monochloromethanephosphonate is dimethallyl monochloromethanephosphonate.
8. The copolymer of 10–90% lower dialkenyl monochloromethanephosphonate and 90–10% of diallyl phthalate.
9. The copolymer of 10–90% lower dialkenyl monochloromethanephosphonate and 90–10% of methyl methacrylate.
10. The copolymer of 10–90% lower dialkenyl monochloromethanephosphonate and 90–10% of diallyl succinate.
11. The copolymer of 10–90% lower dialkenyl monochloromethanephosphonate and 90–10% of vinyl acetate.
12. The copolymer of 10–90% lower dialkenyl monochloromethanephosphonate and 90–10% of a maleic anhydride-ethylene glycol condensation product containing styrene.
13. The copolymer of 10–90% of diallyl monochloromethanephosphonate and 90–10% of diallyl phthalate.
14. The copolymer of 10–90% of diallyl monochloromethanephosphonate and 90–10% of methyl methacrylate.
15. The copolymer of 10–90% of diallyl monochloromethanephosphonate and 90–10% of vinyl acetate.
16. The copolymer of 10–90% of diallyl monochloromethanephosphonate and 90–10% of a maleic anhydride-ethylene glycol condensation product containing styrene.
17. The copolymer 10–90% of dimethallyl monochloromethanephosphonate and 90–10% of a maleic anhydride-ethylene glycol condensation product containing styrene.

References Cited in the file of this patent

UNITED STATES PATENTS

| Number | Name | Date |
|---|---|---|
| 2,497,638 | Toy | Feb. 14, 1950 |
| 2,586,884 | Toy et al. | Feb. 26, 1952 |
| 2,634,244 | Simon et al. | Apr. 7, 1953 |
| 2,714,100 | Toy | July 26, 1955 |

UNITED STATES PATENT OFFICE
CERTIFICATE OF CORRECTION

Patent No. 2,918,449            December 22, 1959

Arthur Dock Fon Toy et al.

It is hereby certified that error appears in the printed specification of the above numbered patent requiring correction and that the said Letters Patent should read as corrected below.

Column 1, line 39, for "methanephosphorus" read -- chloromethanephosphorus --; column 6, line 37, after "copolymer" insert -- of --.

Signed and sealed this 4th day of October 1960.

(SEAL)
Attest:

KARL H. AXLINE
Attesting Officer

ROBERT C. WATSON
Commissioner of Patents